Patented Feb. 29, 1944

2,342,649

UNITED STATES PATENT OFFICE 2,342,649

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application September 8, 1941, Serial No. 410,083

16 Claims. (Cl. 252—344)

This invention relates to a process for breaking petroleum emulsions, my present application being a continuation, in part, of my co-pending application, Serial No. 360,803, filed October 11, 1940, now U. S. Patent No. 2,262,740, dated November 11, 1941, which discloses a process for preventing water-in-oil type emulsions resulting from acidization of calcareous oil-bearing strata, wherein the treating agent employed is a composition of matter consisting of a mineral acid, such as hydrochloric acid, in admixture with a particular emulsion-preventing agent specifically described in said application.

In said aforementioned copending application the emulsion-preventing agent was referred to in view of the most suitable method of manufacture, as a condensation product. Attention is directed to the fact that my above mentioned application makes it clear that the condensation product or products therein described as (1st) New compositions of matter;

(2nd) That a large variety of the materials therein described represent surface-active materials, or more specifically, cation-active materials; and (3rd) That the products or materials described in said application are adapted for use as demulsifiers in the manner that demulsifying materials are most widely used in the production of crude oil or removal of salt in refinery practice.

The subsequent subject-matter of the instant specification is substantially a verbatim copy of the subject-matter appearing in the aforementioned co-pending application, except that there is eliminated such data as is concerned primarily with acidization of calcareous structure, and reference to the matter contemplated is as a condensation product, chemical product, or the like, rather than specific reference to it as an emulsion-preventing agent.

The condensation product or chemical compound used as the demulsifying agent in my herein disclosed process for breaking petroleum emulsions of the water-in-oil type, is obtained by reaction between a high molal, water-insoluble alcohol and a polymerized polyamine, derived from a hydroxylated polyamine containing at least one nitrogen atom not directly linked to a hydroxy hydrocarbon radical, and preferably, at least two amino nitrogen atoms not directly linked to a hydroxy hydrocarbon radical. Such reactants are mixed together so that there is at least one mole of the high molal, water-insoluble alcohol for each mole of polymerized hydroxylated polyamine; and there may be several moles of such high molal alcohols combined with each mole of the polymerized hydroxylated amine. Such condensation is effected by the action of the heat generally at a temperature above 200° C., and may be conducted at a temperature as high as 325° C. Generally speaking, the range of 250–275° C. represents an optimum temperature. Preferably, condensation is conducted by first polymerizing such hydroxylated amines and then condensing the polymerized hydroxylated polyamine with the selected alcohol. Polymerization catalysts consists of materials of the kind commonly employed to polymerize hydroxylated monoamines, such as triethanolamine. They include materials such as caustic soda, caustic potash, high molal amines, soaps, sodium glycerate, sodium methylate, sodium ethylate, and the like. The amounts used vary from 1% to approximately 0.1%, or even less. Polymerization is generally conducted at a temperature range of approximately 225–275° C. Constant stirring is desirable during polymerization and condensation. Such condensation products usually are cation-active materials. The detailed composition of the products obtained is not known, although in a general way, ether linkages must be involved.

For this reason many of the properties of the materials are unpredictable. It is surprising to find that such materials are stable for an extended period of time in half-concentrated hydrochloric acid, or other similar mineral acids. It is likewise remarkable to note that such solutions in acid, and particularly in relatively low ratios, as hereinafter described, give a very pronounced lowering of the surface tension. This is especially true in such compounds or condensation products that are derived at relatively high temperatures, and especially if derived from polyamino reactants having at least two amino nitrogen atoms not directly linked to a hydroxy hydrocarbon radical. It is difficult to indicate a detailed probable structure for such compounds which would account for their resistance to decomposition in strong acid solution.

As indicated, an amine may act as a catalyst; or stated in another way, the hydroxylated amine of the kind employed as a reactant in the production of the emulsion-preventing agent or condensation product, may act as its own polymerization catalyst. For instance, in condensation product Examples 1–8, inclusive, as described subsequently, the added catalyst may be eliminated or reduced, with probable increased time of condensation being required. Thus, in the hereto appended claims, reference to a catalyst is intended to include the amine itself, as well as an added catalyst, if employed.

One class of reactants employed as a raw material in the manufacture of the demulsifier used in my process, is the class of high molal, water-insoluble alcohols. Such high molal alcohols are well-known compounds, and the method of producing or obtaining the same is common knowledge. Briefly stated, such high molal alcohols may be aliphatic, alicyclic, or cycloaliphatic in nature. They may be primary, secondary, or tertiary alcohols, and may be saturated or unsaturated. They may be derived from different sources. Some of the alcohols occur in nature as a constituent of naturally-occurring waxes. Such alcohols include the following: Cetyl alcohol, octadecyl alcohol, arachyl alcohol, carnaubyl alcohol, ceryl alcohol, myricyl alcohol, pisangceryl alcohol. Other alcohols are obtained from natural fats (vegetable or animal oils or fats) and from waxes, by reduction or other processes. Examples of suitable materials for use as reduction reactants are tallow, sperm oil, cocoanut oil, etc. Such alcohols are frequently designated by indicating the source of fatty acids or the like from which they are obtained. Thus, they may be referred to as oleyl alcohol, stearyl alcohol, ricinoleyl alcohol, etc. The same procedure which is employed in connection with the conversion of fatty acids or their esters to alcohols, is also applicable to somewhat kindred monocarboxy acids or esters, such as naphthenic acid, abietic acid, and the like; and thus there are available corresponding naphthenyl alcohols, abietyl alcohols, etc. Water-insoluble cycloaliphatic alcohols are obtained in various ways, including reactions between a phenolic body and an alkylene oxide, such as ethylene oxide, or between a phenolate and a monochlorhydrin, or the like. Alcohols somewhat similar to abietyl alcohols, and sometimes referred to as resin alcohols, are derived from resins, such as dammar, copal, etc. The alcohols may have straight chains or branch chains.

Examples include nonyl alcohol, decyl alcohol, dodecyl alcohol, tetradecyl alcohol, hexadecyl alcohol, octadecyl alcohol, and the like.

Another class of alcohols is derived from oxidized petroleum, which consists predominantly of secondary aliphatic alcohols contained in a range of about 9–28 carbon atoms per molecule. See U. S. Patent No. 1,909,295, dated May 16, 1933, to Luther et al. See also U. S. Patent No. 2,108,756, dated February 15, 1938, to McAllister. As to a number of alcohols containing 9–25 carbon atoms and which represent secondary alcohols of the branch chain type, see U. S. Patent No. 2,088,020, dated July 27, 1937, to Wickert. As to other suitable high molal tertiary alcohols, reference is made to U. S. Patent No. 2,084,253, dated June 15, 1937, to Hintermaier. As to certain cycloaliphatic alcohols, see U. S. Patent No. 2,174,131, dated September 26, 1939, to Lubs.

As to unsaturated alcohols, for example, attention is directed to those which occur naturally as a constituent of sperm oil or the like, and further reference is made to U. S. Patent No. 2,199,403, dated May 7, 1940, to Henk et al.

The hydroxylated polyamines characterized by the presence of at least one amino nitrogen atom not directly attached to a hydroxy hydrocarbon radical, are well known compounds. They may be obtained in various ways. The commonest procedure is to treat a polyamine with an alkylene oxide or its equivalent, such as ethylene oxide, propylene oxide, butylene oxide, glycidol, or the like. The commoner polyamines which can be so treated with an oxy-alkylating agent include the following: Ethylene diamine; diethylene triamine; triethylene tetramine; tetraethylene pentamine; pentaethylene hexamine; propylene diamine; dipropylene triamine; tripropylene tetramine; tetrapropylene pentamine; pentapropylene hexamine, etc. In some instances such amines may be treated with an alkylating agent or the like so as to introduce an alkyl, aralkyl, or alicyclic radical into the compound as a substitute for an amino hydrogen atom. For instance, one may obtain diethyl tetraethylene pentamine in the conventional manner, using ethyl iodide or the like as an alkylating agent.

In any event, having selected a suitable polyamine, the product is then treated with any acceptable oxy-alkylating agent, such as ethylene oxide, propylene oxide, and the like. In view of the lower cost of ethylene oxide and in view of its greater activity, it is most frequently employed. For instance, ethylene diamine can be treated with one mole of ethylene oxide to produce hydroxyethyl ethylene diamine. Diethylene triamine can be treated with three moles of ethylene oxide so as to yield triethanol diethylene triamine. Triethylene tetramine can be treated with four moles of ethylene oxide to yield tetraethanol triethylene tetramine. Similarly, one can obtain tetraethanol tetraethylene pentamine, or tetraethanol pentaethylene hexamine. One can employ propylene oxide or glycidol to give similar products. In view of the fact that the most inexpensive polyamine now available is tetraethylene pentamine, I prefer to treat tetraethylene pentamine with three moles, four moles, or five moles of ethylene oxide to give the corresponding triethanol tetraethanol, and pentaethanol derivatives, and to employ such derivatives.

In the manufacture of the demulsifier used in my process it is sometimes desirable to add a polyhydric alcohol, such as glycerol, ethylene glycol, diethylene glycol, diglycerol, propylene glycol, or the like. The effect of adding such polyhydric alcohol is essentially the same effect as would be obtained by treating the high molal alcohol with an alkylene oxide, such as ethylene oxide, propylene oxide, glycidol, or the like, or treating the unpolymerized hydroxylated amine in a similar manner, or treating the polymerized hydroxylated amine in a kindred fashion.

In view of the numerous reactants which have been indicated, it is obvious that one can obtain a variety of condensation products or emulsion-preventing reagents. If a compound or emulsion-preventing agent is not soluble enough, its solubility or the solubility of its salt can be increased in various manners, for instance:

(a) Emply an alcohol having a lower molecular weight;

(b) Use fewer moles of alcohol per mole of original unpolymerized polyamine;

(c) Select as a raw material an amine having a greater number of amino nitrogen atoms;

(d) Select as a raw material an amine having a greater number of hydroxy hydrocarbon radicals;

(e) Select as an amine a compound having both an increased number of nitrogen atoms and an increased number of hydroxy hydrocarbon radicals;

(f) Add a polyhydric alcohol, such as glycerol, at some selected stage subsequently indicated;

(g) Vary the degree of polymerization of the hydroxylated amine in the manner subsequently indicated.

Inversely, it will sometimes happen that the condensation product or emulsion-preventing agent is too soluble; or, to state the matter another way, it does not possess sufficient surface activity for the purpose intended. In such instances it may be desirable to decrease the hydrophile properties. It is unnecessary to remark that this requires only a reversal of one or more of the procedures previously enumerated. It is believed that in view of what has been said, the compounds of the kind contemplated can be prepared without further directions or illustrations. However, for the purpose of indicating the preferable type of condensation product or emulsion-preventing agent, attention is directed to the following examples:

*Polymerized hydroxylated polyamine—Example 1*

Triethylene tetramine is treated with four moles of ethylene oxide to produce tetraethanol triethylene tetramine. Approximately three-fourths of a percent of caustic soda is added to this material by weight, and the hydroxylated amine is heated for approximately two to four hours at about 245–260° C. The mass is stirred constantly and any distillate is condensed and reserved for re-use after an intermediate re-running step. As polymerization takes place, as indicated by elimination of water and increase in viscosity of the residual mass, cryoscopic molecular weight determinations are made on the polyamine or a suitable salt, such as the acetate, or the like, and polymerization is stopped when such molecular weight determinations indicate that the material based on average values is largely dimeric.

*Polymerized hydroxylated polyamine—Example 2*

The same procedure is employed as in the previous example, except that heating is conducted for approximately 1–3 hours longer. Tests are made in the same manner as previously indicated, and polymerization is stopped when determinations indicate that the average molecular weight is equivalent to a trimeric product.

*Polymerized hydroxylated polyamine—Example 3*

The same procedure is followed as in Example 2, preceding, except that a slightly higher temperature is employed, i. e., about 10° higher, and if need be, a slightly longer time; and the process is continued until the product indicates an average molecular weight equal to or exceeding that of a tetramer.

*Polymerized hydroxylated polyamine—Example 4*

The preceding examples are repeated, adding one mole of glycerol for each mole of hydroxylated amine employed.

*Polymerized hydroxylated polyamine—Example 5*

Examples 1–3, inclusive, are repeated, adding two moles of glycerol for each mole of hydroxylated polyamine employed.

*Polymerized hydroxylated polyamine—Example 6*

Tetraethanol pentaethylene hexamine is substituted for tetraethanol tetraethylene tetramine in Examples 1–5.

*Polymerized hydroxylated polyamine—Example 7*

Tetraethanol tetraethylene pentamine is substituted for tetraethanol pentaethylene hexamine in the preceding example.

*Polymerized hydroxylated polyamine—Example 8*

Pentaethanol tetraethylene pentamine is substituted for tetraethanol tetraethylene pentamine in the preceding example.

*Polymerized hydroxylated polyamine—Example 9*

Hexaethanol tetraethylene pentamine is substituted for pentaethanol tetraethylene pentamine in the previous example.

*Condensation product—Example 1*

A mixture is prepared using one pound mole each of the following: Cetyl alcohol and a material of the kind exemplified by polymerized hydroxylated polyamine, Example 1. The products are mixed and stirred constantly, holding the temperature at approximately 200–275° C. until no unreacted high molal alcohol remains. The bulk of such high molal alcohol generally disappears within two to three hours; but sometimes it is necessary to heat from 6–12 hours to obtain substantially complete reaction. The final completion of reaction is indicated in various ways, and usually by the fact that the product gives a clear solution in dilute acetic acid.

*Condensation product—Example 2*

Normal nonyl alcohol is substituted for cetyl alcohol in Example 1.

*Condensation product—Example 3*

Normal decyl alcohol is substituted for cetyl alcohol in Example 1.

*Condensation product—Example 4*

Dodecyl alcohol is substituted for cetyl alcohol in Example 1.

*Condensation product—Example 5*

Tetradecyl alcohol is substituted for cetyl alcohol in Example 1.

*Condensation product—Example 6*

The examples of the type previously indicated are repeated with the addition of one pound mole of glycerol for each pound mole of the high molal alcohol.

*Condensation product—Example 7*

Example 6 is repeated, using two pound moles of glycerol in each instance instead of one pound mole.

*Condensation product—Example 8*

Examples 1–7, preceding, are repeated, using polymerized hydroxylated polyamines, Examples 2–9, instead of Example 1, as in the previous examples.

It is to be noted that the expression "condensation product" has been used to indicate a compound derived from one mole of a polymerized hydroxylated amine of the kind described, and at least one mole of a high molal, water-insoluble alcohol of the kind described.

In the hereto appended claims, reference to the use of the condensation product is intended to include the base form, i. e., the chemical combination of water, and also the salt form, such as the lactate, acetate, citrate, or the like.

It has been previously pointed out that this invention is concerned with derivatives of polymerized hydroxylated amines of the kind described. It is not concerned with such instances where analogous emulsion-preventing agents or condensation products are derived from unpolymerized amines. As to the application of such analogous product, see my copending application for Patent, Serial No. 360,802, filed October 11, 1940, which has matured into Patent No. 2,262,-739, granted November 11, 1941, and also Serial No. 410,082, filed September 8, 1941.

Having thus described my invention, what I claim as new and desire to secure by Letters Patent is:

1. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least one amino nitrogen atom not directly linked to a hydroxy hydrocarbon radical, and at least one mole of a high molal, water-insoluble alcohol containing at least 9 carbon atoms and not more than 31 carbon atoms.

2. A process for breaking petroleum emulsions of the water-in-oil type, characterized by subjecting the emulsion to the action of a demulsifying agent comprising the condensation product derived from one mole of a ploymerized amine obtained by heat polymerization in presence of a catalyst, from a hydroxylated polyalkylene amine containing at least one amino nitrogen atom not directly linked to a hydroxy hydrocarbon radical, and at least one mole of a high molal, water-insoluble, aliphatic alcohol containing at least 9 carbon atoms and not more than 31 carbon atoms.

3. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least one amino nitrogen atom not directly linked to a hydroxy hydrocarbon radical, and at least one mole of a high molal, water-insoluble, primary aliphatic alcohol containing at least 9 carbon atoms and not more than 31 carbon atoms.

4. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least two amino nitrogen atoms not directly linked to a hydroxy hydrocarbon radical, and at least one mole of a high molal, water-insoluble, primary aliphatic alcohol containing at least 9 carbon atoms and not more than 31 carbon atoms.

5. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least two amino nitrogen atoms not directly linked to a hydroxy hydrocarbon radical, and one mole of a high molal, water-insoluble, primary aliphatic alcohol containing at least 9 carbon atoms and not more than 31 carbon atoms.

6. A process for breaking petroleum emulsions of the water-in-oil type, characterized by subjecting the emulsion to the action of a demulsifying agent comprising the condensation product derived from one mole of a polymerized amine obtained by heat polymerization in the presence of a catalyst, from a hydroxylated polyalkylene amine containing at least two amino nitrogen atoms not directly linked to a hydroxy hydrocarbon radical, and one mole of a high molal, water-insoluble, primary aliphatic alcohol containing at least 9 carbon atoms and not more than 18 carbon atoms.

7. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyethylene amine containing at least two amino nitrogen atoms not directly linked to a hydroxy hydrocarbon radical, and one mole of a high molal, water-insoluble, primary aliphatic alcohol containing at least 9 carbon atoms and not more than 18 carbon atoms.

8. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a tetraethanol tetraethylene pentamine, and one mole of a high molal, water-insoluble, primary aliphatic alcohol containing at least 9 carbon atoms and not more than 18 carbon atoms.

9. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least one amino nitrogen atom not directly linked to a hydroxy hydrocarbon radical, at least one mole of a high molal, water-insoluble alcohol containing at least 9 carbon atoms and not more than 31 carbon atoms, and at least one mole of a polyhydric alcohol.

10. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least one amino nitrogen atom not directly linked to a hydroxy hydrocarbon radical, at least one mole of a high molal, water-insoluble, aliphatic alcohol containing at least 9 carbon atoms and not more than 31 carbon atoms, and at least one mole of a polyhydric alcohol.

11. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least one amino nitrogen atom not directly linked to a hydroxy hydrocarbon radical, at least one mole of a high molal, water-insoluble, primary aliphatic alcohol containing at least 9 carbon atoms and not more than 31 carbon atoms, and at least one mole of a polyhydric alcohol.

12. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least two amino nitrogen atoms not directly linked to a hydroxy hydrocarbon radical, at least one mole of a high molal, water-insoluble, primary aliphatic alcohol containing at least 9 carbon atoms and not more than 31 carbon atoms, and at least one mole of a polyhydric alcohol.

13. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least two amino nitrogen atoms not directly linked to a hydroxy hydrocarbon radical, one mole of a high molal, water-insoluble, primary aliphatic alcohol containing at least 9 carbon atoms and not more than 31 carbon atoms, and at least one mole of a polyhydric alcohol.

14. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyalkylene amine containing at least two amino nitrogen atoms not directly linked to a hydroxy hydrocarbon radical, one mole of a high molal, water-insoluble, primary aliphatic alcohol containing at least 9 carbon atoms and not more than 18 carbon atoms, and at least one mole of a polyhydric alcohol.

15. A process for breaking petroleum emulsions of the water-in-oil type, characterized by subjecting the emulsion to the action of a demulsifying agent comprising the condensation product derived from one mole of a polymerized amine obtained by heat polymerization in presence of a catalyst, from a hydroxylated polyethylene amine containing at least two amino nitrogen atoms not directly linked to a hydroxy hydrocarbon radical, one mole of a high molal, water-insoluble, primary aliphatic alcohol containing at least 9 carbon atoms and not more than 18 carbon atoms, and at least one mole of a polyhydric alcohol.

16. A process for breaking petroleum emulsions of the water-in-oil type, characterized by subjecting the emulsion to the action of a demulsifying agent comprising the condensation product derived from one mole of a polymerized amine obtained by heat polymerization of a catalyst, from a tetraethanol tetraethylene pentamine, one mole of a high molal, water-insoluble, primary aliphatic alcohol containing at least 9 carbon atoms and not more than 18 carbon atoms, and at least one mole of a polyhydric alcohol.

MELVIN DE GROOTE.